United States Patent
Subramanian et al.

(10) Patent No.: US 12,413,567 B2
(45) Date of Patent: Sep. 9, 2025

(54) METHOD TO ACHIEVE DYNAMIC NAT66 ENCRYPTION AND DECRYPTION

(71) Applicant: Cisco Technology, Inc., San Jose, CA (US)

(72) Inventors: Rajamathangi Subramanian, Austin, TX (US); David Maluf, Mountain View, CA (US); Eric Voit, Bethesda, MD (US)

(73) Assignee: Cisco Technology, Inc., San Jose, CA (US)

( * ) Notice: Subject to any disclaimer, the term of this patent is extended or adjusted under 35 U.S.C. 154(b) by 147 days.

(21) Appl. No.: 18/498,877

(22) Filed: Oct. 31, 2023

(65) Prior Publication Data
US 2025/0141855 A1    May 1, 2025

(51) Int. Cl.
*H04L 9/40*    (2022.01)
(52) U.S. Cl.
CPC ................. *H04L 63/0485* (2013.01)
(58) Field of Classification Search
None
See application file for complete search history.

(56) References Cited

U.S. PATENT DOCUMENTS

| | | | |
|---|---|---|---|
| 11,711,399 B2* | 7/2023 | Konda | H04L 63/0236 726/1 |
| 2013/0148665 A1 | 6/2013 | Ludwig et al. | |
| 2013/0212240 A1 | 8/2013 | Thornewell et al. | |
| 2013/0275751 A1 | 10/2013 | Fink et al. | |
| 2018/0227229 A1 | 8/2018 | Lopez | |
| 2021/0352047 A1 | 11/2021 | Singh et al. | |
| 2023/0155978 A1 | 5/2023 | Thubert et al. | |
| 2023/0412583 A1* | 12/2023 | Purta | H04L 61/5007 |
| 2025/0088480 A1* | 3/2025 | Florian | H04L 61/2514 |

* cited by examiner

*Primary Examiner* — Nelson S. Giddins
(74) *Attorney, Agent, or Firm* — Polsinelli P.C.

(57) ABSTRACT

The disclosed technology addresses the need in the art for systems and methods of dynamic but stateless NAT encryption and decryption. The disclosed technology provides a robust encryption/decryption algorithm for concurrently obfuscating source and destination IPv6 addresses for SNAP deployments with 100% reversal and zero collisions, thereby providing protection to both the source and destination IPv6 simultaneously.

20 Claims, 6 Drawing Sheets

METHOD TO ACHIEVE DYNAMIC NAT66 ENCRYPTION AND DECRYPTION

BACKGROUND

Networks, such as the Internet, use the Domain Name System (DNS) to essentially provide mappings between human-readable domain names (e.g., website addresses, service addresses, etc.) that client devices are seeking, and the actual Internet Protocol (IP) addresses for devices hosting the websites or providing the services. Generally, client devices send DNS queries to resolve domain names to a DNS server, and the DNS server then resolves the domain names to the corresponding IP addresses and sends DNS responses to the client devices that include the IP addresses. The client devices are then able to communicate data packets with the desired website or service using the IP address of the device(s) supporting the website or service.

Privacy may be important with networks and devices on networks. For example, some devices may rotate (i.e., randomize) Media Access Control (MAC) addresses on access networks so that identity may not be easily tracked (i.e., identity obfuscation). However, this randomization may devalue network identity. Devaluing network identity may also devalue the benefit of equipment provided by a particular manufacturer. Accordingly, it may be valuable for a manufacturer to provide an identity obfuscation process for Internet Protocol (IP) addresses so that data center providers may not glean information about the networks or devices simply by the topology of the exposed IP addresses.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DETAILED DESCRIPTION

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

According to at least one example, a method includes: receiving a DNS request to resolve a domain name on behalf of a source service; forwarding a data packet having an unencrypted source address to a first server that manages connections between the source service and a destination service; obfuscating, by the first server, the into an encrypted source address for the data packet, wherein the encrypted source address includes a cipher associated with a plurality of ciphers; forwarding the DNS request over a public DNS to a secure DNS resolver of a destination service; forwarding, by the DNS resolver of the destination service, an unencrypted destination address to a second server that managing connections between the source service and the destination service; obfuscating, by the second server, the into an encrypted destination address for a return packet, wherein the encrypted destination address includes the cipher associated with the plurality of ciphers; receiving, by the source service, the from the destination service, wherein the return packet has the encrypted destination address including the cipher encoded therein; forwarding, a packet flow, the having the encrypted source address and the encrypted destination address from the first server to the second server; identifying a decipher algorithm of a plurality of decipher algorithms based on the cipher; applying the decipher algorithm to the encrypted destination address to identify an unencrypted destination address for the data packet; and forwarding the data packet to the unencrypted destination address According to at least one example, a system includes a storage (implemented in circuitry) configured to store instructions and a processor is provided. The processor configured to execute the instructions and cause the processor to: receive a Domain Name Service (DNS) request to resolve a domain name on behalf of a source service; forward a data packet having an unencrypted source address to a first server that manages connections between the source service and a destination service; obfuscate, by the first server, the unencrypted source address into an encrypted source address for the data packet, wherein the encrypted source address includes a cipher associated with a plurality of ciphers; forward the DNS request over a public DNS to a secure DNS resolver of a destination service; forward, by the DNS resolver of the destination service, an unencrypted destination address to a second server that manage connections between the source service and the destination service; obfuscate, by the second server, the unencrypted destination address into an encrypted destination address for a return packet, wherein the encrypted destination address includes the cipher associated with the plurality of ciphers; receive, by the source service, the return packet from the destination service, wherein the return packet has the encrypted destination address including the cipher encoded therein; forward, along a packet flow, the data packet having the encrypted source address and the encrypted destination address from the first server to the second server; identify a decipher algorithm of a plurality of decipher algorithms based on the cipher; apply the decipher algorithm to the encrypted destination address to identify an unencrypted destination address for the data packet; and forward the data packet to the unencrypted destination address.

According to at least one example, a non-transitory computer readable medium comprising instructions using a computer system is provided. The computer includes a memory (e.g., implemented in circuitry) and a processor (or multiple processors) coupled to the memory. The processor (or processors) is configured to execute the computer readable medium and cause the processor to: receive a Domain Name Service (DNS) request to resolve a domain name on behalf of a source service; forward a data packet having an unencrypt-ed source address to a first server that manages connections between the source service and a destination service; obfuscate, by the first server, the unencrypted source address into an encrypted source address for the data packet, wherein the encrypted source address includes a cipher associated with a plurality of ciphers; forward the DNS request over a public DNS to a secure DNS resolver of a destination service; forward, by the DNS resolver of the destination service, an unencrypted destination address to a second server that manage connections between the source service and the destination service; obfuscate, by the second server, the unencrypted destination address into an encrypted destination address for a return packet, wherein the encrypted destination address includes the cipher associated with the plurality of ciphers; receive, by the source service, the return packet from the destination service, wherein the return packet has the encrypted destination address including the cipher encoded therein; forward, along a packet flow, the data packet having the encrypted source address and the encrypted destination address from the first server to the second server; identify a decipher algorithm of a plurality of decipher algorithms based on the cipher; apply the decipher algorithm to the encrypted destination address to identify an unencrypted destination address for the data packet; and forward the data packet to the unencrypted destination address.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As discussed above, privacy may be a major concern in networks. There may be shifts in market value when end user behavior is obfuscated. Where the network meta data (e.g., Layers 3 and 4) may be visible, it may render endpoints visible or identifiable. This data visibility may mean analytics may be possible because there may be assets and traffic to assess. This may lead to competitive analysis, attacks, etc.

Stateless Network Address privacy (SNAP) allows manufacturers to protect the IP addresses of client and server resources in the network from other hostile entities and from unwanted marketing and ad insertions. However, as discussed above, existing methods of protecting IP addresses require complex encryption/decryption algorithms that are performance intensive in the data path/packet processing path.

Since Stateless encryption of source and destination IP addresses happens in the packet processing path, manufacturers need to have a robust but simultaneously optimized encryption and decryption algorithms to obfuscate the IP addresses (e.g., IPv6 addresses) on a per packet basis.

The disclosed technology addresses the need in the art for systems and methods of dynamic but stateless NAT encryption and decryption. In particular, the disclosed technology provides a robust encryption/decryption algorithm for obfuscating Source and Destination IPv6 addresses for SNAP deployments with 100% reversal and zero collisions. The disclosed technology uses a 4-bit cipher and 4-bit encryption/decryption flavour to achieve stateless NAT66 encryption/decryption by encoding the cipher bits and flavour bits in the packet such that each client IPV6 can be obfuscated to 256 unique values that are 100% reversible and result in zero collisions.

The general technology here encrypts/decrypts both the source NAT IPv6 address and destination NAT IPv6 address concurrently, thereby providing protection to both the source and destination IPv6. In other words, the obfuscation is bidirectional and the NAT IPv6 addresses for the source and destination are obfuscated simultaneously.

Figure 1:
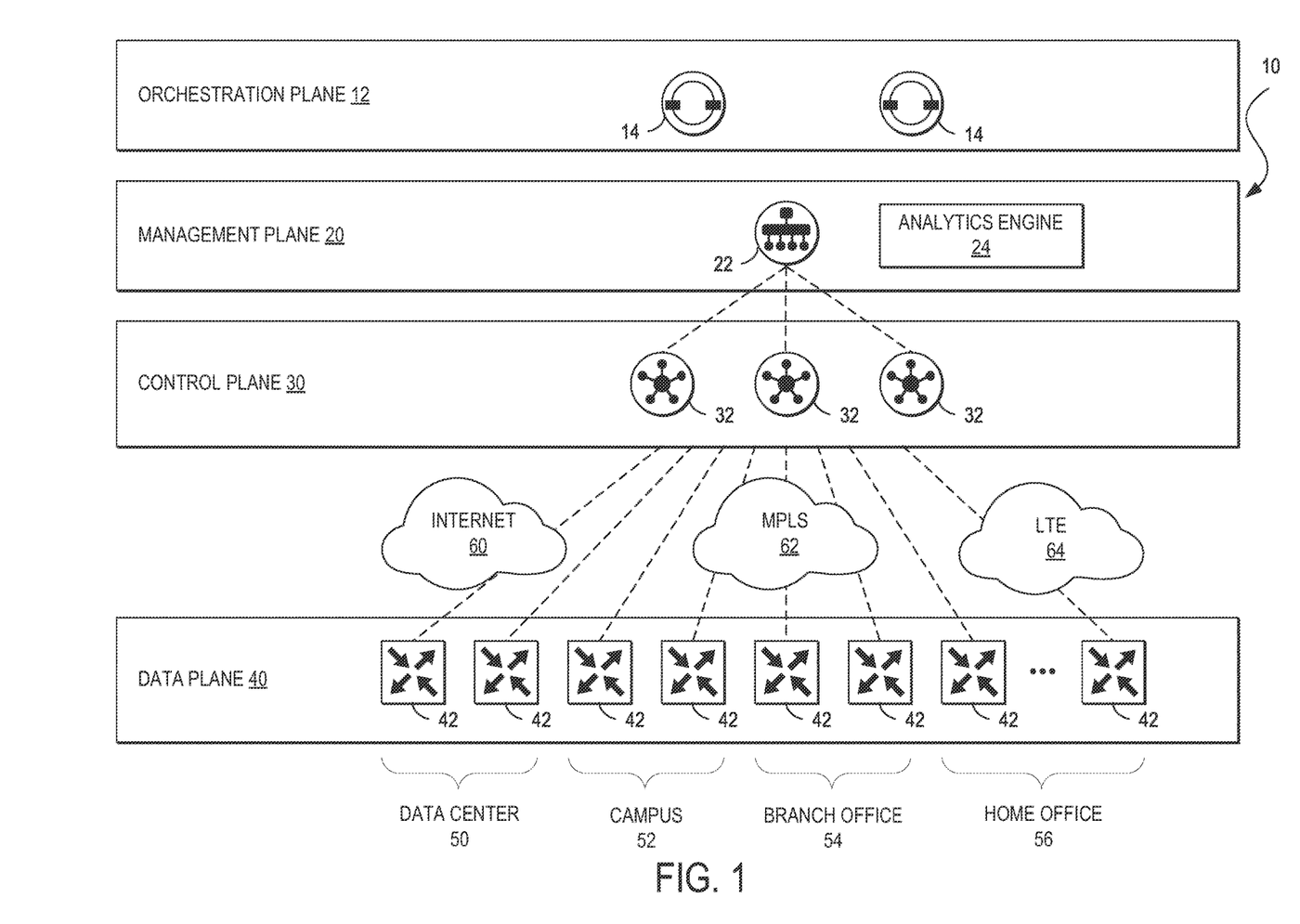
FIG. 1 illustrates an example of a high-level network architecture in accordance with an embodiment.

FIG. 1 illustrates an example of a network architecture 10 for implementing aspects of the present technology. An example of an implementation of the network architecture 10 is the Cisco® SD-WAN architecture. However, one of ordinary skill in the art will understand that, for the network architecture 10 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 10 can comprise an orchestration plane 12, a management plane 20, a control plane 30, and a data plane 40. The orchestration plane can 12 assist in the automatic on-boarding of edge network devices 42 (e.g., switches, routers, etc.) in an overlay network. The orchestration plane 12 can include one or more physical or virtual network orchestrator appliances 14. The network orchestrator appliance(s) 14 can perform the initial authentication of the edge network devices 42 and orchestrate connectivity between devices of the control plane 30 and the data plane 40. In some embodiments, the network orchestrator appliance(s) 14 can also enable communication of devices located behind Network Address Translation (NAT). In some embodiments, physical or virtual Cisco® SD-WAN vBond appliances can operate as the network orchestrator appliance(s) 14.

The management plane 20 can be responsible for central configuration and monitoring of a network. The management plane 20 can include one or more physical or virtual network management appliances 22. In some embodiments, the network management appliance(s) 22 can provide centralized management of the network via a graphical user interface to enable a user to monitor, configure, and maintain the edge network devices 42 and links (e.g., Internet transport network 60, MPLS network 62, 4G/LTE network 64) in an underlay and overlay network. The network management appliance(s) 22 can support multi-tenancy and enable centralized management of logically isolated networks associated with different entities (e.g., enterprises, divisions within enterprises, groups within divisions, etc.). Alternatively or in addition, the network management appliance(s) 22 can be a dedicated network management system for a single entity. In some embodiments, physical or virtual Cisco® SD-WAN vManage appliances can operate as the network management appliance(s) 22.

The control plane 30 can build and maintain a network topology and make decisions on where traffic flows. The control plane 30 can include one or more physical or virtual network controller appliance(s) 32. The network controller appliance(s) 32 can establish secure connections to each network device 42 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliance(s) 32 can operate as route reflectors. The network controller appliance(s) 32 can also orchestrate secure connectivity in the data plane 40 between and among the edge network devices 42. For example, in some embodiments, the network controller appliance(s) 32 can distribute crypto key information among the network device(s) 42. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliance(s) 32.

The data plane 40 can be responsible for forwarding packets based on decisions from the control plane 30. The data plane 40 can include the edge network devices 42, which can be physical or virtual network devices. The edge network devices 42 can operate at the edges various network environments of an organization, such as in one or more data centers or colocation centers 50, campus networks 52, branch office networks 54, home office networks 54, and so forth, or in the cloud (e.g., Infrastructure as a Service (IaaS), Platform as a Service (PaaS), SaaS, and other cloud service provider networks). The edge network devices 42 can provide secure data plane connectivity among sites over one or more WAN transports, such as via one or more Internet transport networks 60 (e.g., Digital Subscriber Line (DSL), cable, etc.), MPLS networks 62 (or other private packet-switched network (e.g., Metro Ethernet, Frame Relay, Asynchronous Transfer Mode (ATM), etc.), mobile networks 64 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 42 can be responsible for traffic forwarding, security, encryption, quality of service (QOS), and routing (e.g., BGP, OSPF, etc.), among other tasks. In some embodiments, physical or virtual Cisco® SD-WAN vEdge routers can operate as the edge network devices 42.

Figure 2:
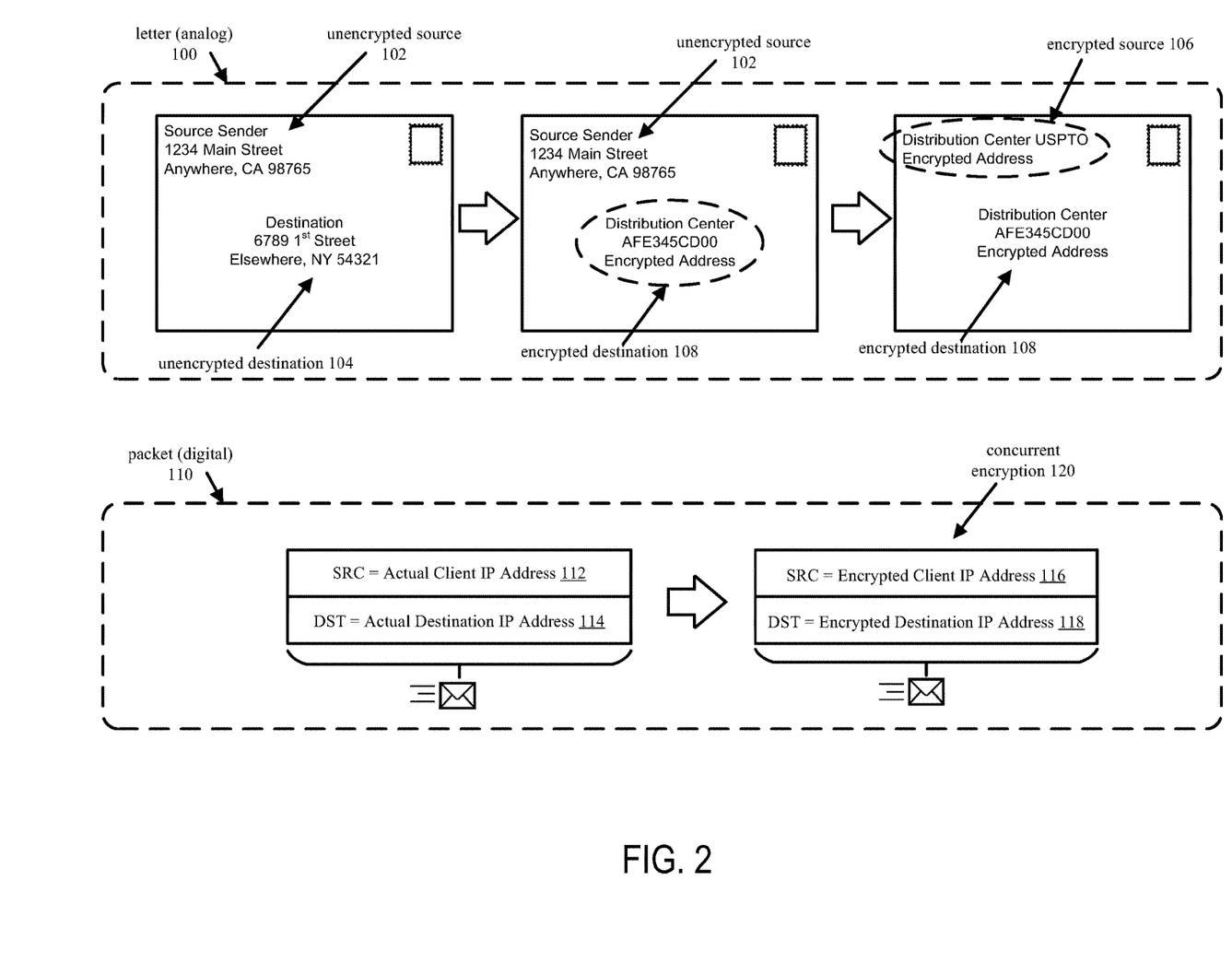
FIG. 2 illustrates analog and digital examples of randomizing the destination of a letter or a data packet in accordance with some embodiments of the present technology.

FIG. 2 illustrates analog and digital examples of concurrently encrypting both a source and destination address in order to protect both the identify of both the source and destination. In particular, a letter (analog) 100 example is illustrated where the letter 100 initially has an unprotected or unencrypted source address 102 as well as an unprotected or unencrypted destination address 104. In such an example, any entity that sees the letter (e.g., post office workers) would be able to determine the identity of the sender who is communicating with another person at a destination. However, the sender may desire that his or her identity be kept private, and also desire that the destination of their letters be kept private as well.

Accordingly, the sender may place an encrypted source address 106 in the letter 100 such that people who see the letter 100 are unable to determine who sent the letter 100. Additionally, the sender may further desire that the unencrypted destination address 104 be obfuscated as well to prevent users from attempting to determine who is sending the letter 100 to the destination. Thus, the letter 100 may further have an encrypted destination address 108. The encrypted destination address 108 may be a distribution center through which the destination can be reached, but an observer may be unable to determine from whom, and to whom, the letter 100 is being sent.

FIG. 2 further illustrates a packet (digital) 110 example where similar techniques are performed on a packet 110. As shown, the packet 110 may originally have the actual client IP address 112 listed as the source address, and the actual destination IP address 114 listed as the destination address. However, the sender and/or receiver of the packet 110 may prefer that the source and destination addresses be obfuscated such that observers (e.g., public Internet observers) are unable to determine the source and/or destination of the packet 110. As shown, the packet 110 may then be obfuscated to instead show encrypted client IP address 116 and encrypted destination IP address 118 as further described herein. Furthermore, the systems and methods described herein provide for concurrent encryption 120 of the actual client IP address 112 and actual destination IP address 114.

Figure 3:
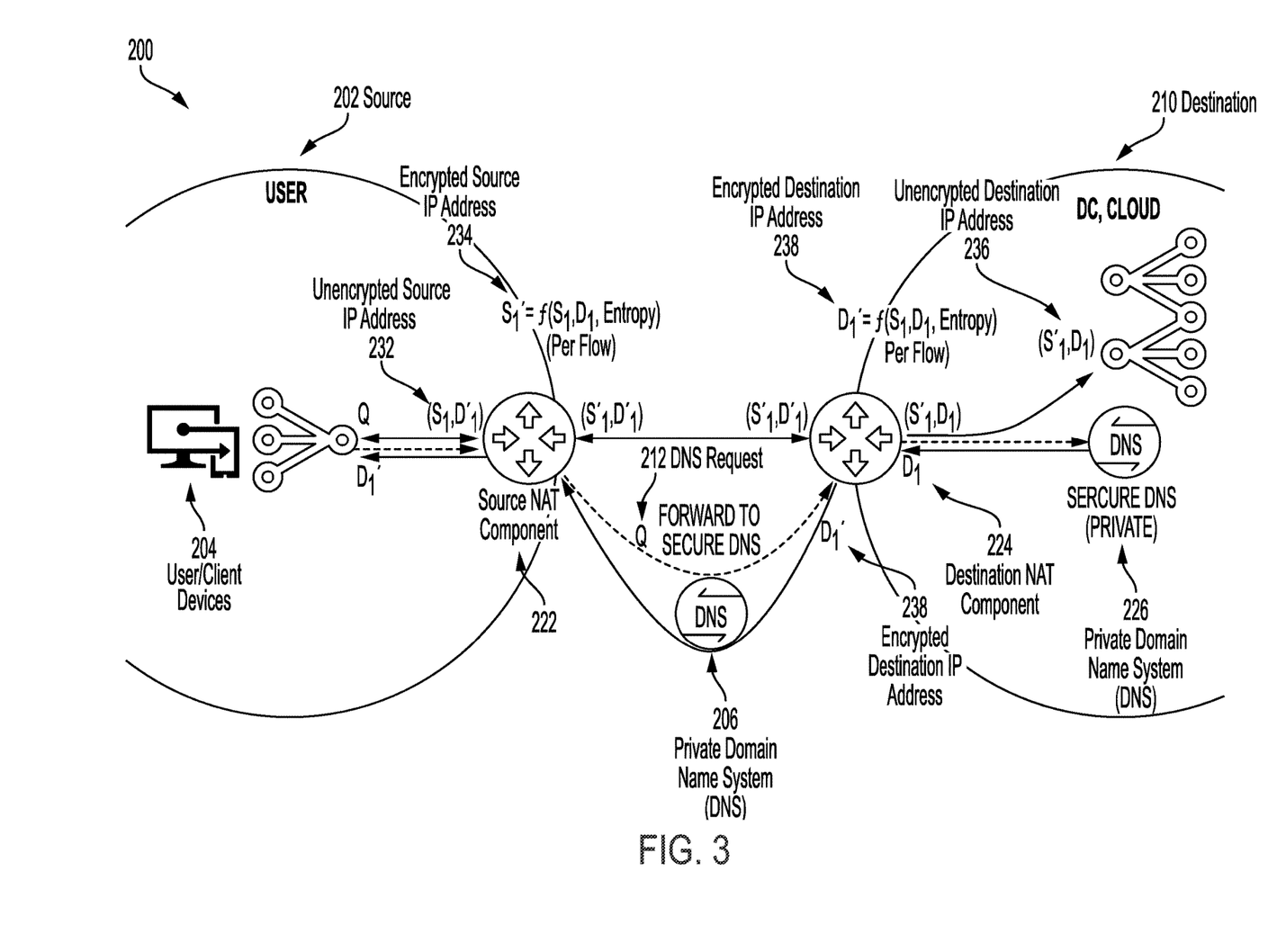
FIG. 3 illustrates a system-architecture diagram for providing dynamic NAT66 encryption and decryption bidirectionally in accordance with some embodiments of the present technology.

FIG. 3 illustrates a system-architecture diagram for providing dynamic NAT66 encryption and decryption bidirectionally and concurrently. As shown in FIG. 3, operating environment 200 may comprise a source 202 which may include a one or more client devices 204 and a source NAT Component 222 and a destination 210 which may include a destination NAT Component 224 and may further include a private DNS 226. The operating environment 200 may also comprise a public Domain Name Server (DNS) 206. The source 202 may include client devices 204 which may include, but are not limited to, a smart phone, a personal computer, a tablet device, a mobile device, a telephone, a remote control device, a set-top box, a digital video recorder, an Internet-of-Things (IoT) device, a network computer, a router, an Automated Transfer Vehicle (ATV), a drone, an Unmanned Aerial Vehicle (UAV), a Virtual reality (VR)/Augmented reality (AR) device, or other similar microcomputer-based device. Destination 210 may comprise, but it not limited to, host computing device that may host, for example, a website in the cloud.

Public DNS 206 and private DNS 226 may comprise a server used in the domain name system. The domain name system may comprise a hierarchical and decentralized naming system used to identify computers reachable through the Internet or other IP networks. Resource records contained in public DNS 206 and private DNS 226 may associate domain names with other forms of information. These may be used to map human-friendly domain names to the numerical IP addresses computers may need to locate services and devices using the underlying network protocols.

In some examples, the operating environment 200 may further include a source NAT component 222 and a destination NAT component 224. Source NAT component 222 and destination NAT component 224 may be servers connected to the source 202 system and the destination 210 system respectively, or may be part of the source 202 and destination 210 themselves. While the source NAT Component 222 and destination NAT Component 224 are illustrated as separate servers in the example shown, it is appreciated that in some implementations, the source NAT Component 222 and destination NAT Component 224 may be part of a single server, may be separate servers, or may be the same server. In some examples, the source NAT component 222 and/or the destination NAT component may be a NAT66 gateway. The source NAT component 222 may translate the unencrypted source IP address 232 in the source address field of a data packet into an encrypted source IP address 234 as further discussed below. The destination NAT component 224 may simultaneously translate the unencrypted destination IP address 236 in the destination address field of a data packet into an encrypted destination IP address 238 as further discussed below. Thus, the source NAT component 222 may translate the unencrypted source IP address 232 of a client data packet to the encrypted source IP address 234 while the destination NAT component 224 may translate the unencrypted destination IP address 236 to the encrypted destination IP address 238. In some examples, this translation may occur concurrently or simultaneously, thereby simultaneously obfuscating and protecting both the source IP address and the destination IP address from observers in the public network (e.g., at Public DNS 206).

As further shown in FIG. 3, the client devices 204 may generate and send a DNS request 212 to the public DNS 206. The DNS request 212 may include a request for the DNS 206 to translate a domain name into an IP address that can be used for sending traffic to the destination (e.g., a desired website, service, etc., associated with the domain name).

The public DNS 206 may receive the DNS request 212 and forward the DNS request 212 to a secure private DNS 226. The secure private DNS 226 may be at the destination such that the information regarding the destination IP address is secure. In response to the DNS request 212, the private DNS 226 may return an unencrypted destination IP address 236.

However, rather than return an actual unencrypted destination IP address 236 of a device, the destination NAT component 224 may intercept the unencrypted destination IP address 236 and obfuscate the unencrypted destination IP address 236 into an encrypted destination IP address 238, such that public DNS 206 may return the encrypted destination IP address 238 to the source 202 instead of the unencrypted destination IP address 236. For example, if the source 202 sends the public DNS 206 a DNS request 212 for the address of the destination 210, public DNS 206 may return the encrypted destination IP address 238 of destination 210, thereby protecting the identity of the destination address.

As further shown in FIG. 3, the source 202 will also send a data packet having its unencrypted source IP address 232 to be delivered to the destination 210. The data packet having the unencrypted source IP address 232 will be intercepted by the source NAT component 222 and obfuscate the unencrypted source IP address 232 into an encrypted source IP address 234 as further described below. Then, the data packet having this encrypted source IP address 234 may be sent along a flow from source 202 to destination 210. Critically, as the encrypted destination IP address 238 is received by source 202 as described above, the data packet delivered along the flow will include both the encrypted destination IP address 238 and the encrypted source IP address 236 (or $S_1'$, $D_1'$). Once this data packet is received by the destination 210, it can then be deciphered back into unencrypted destination IP address 236 for delivery to the destination 210.

Figure 4:
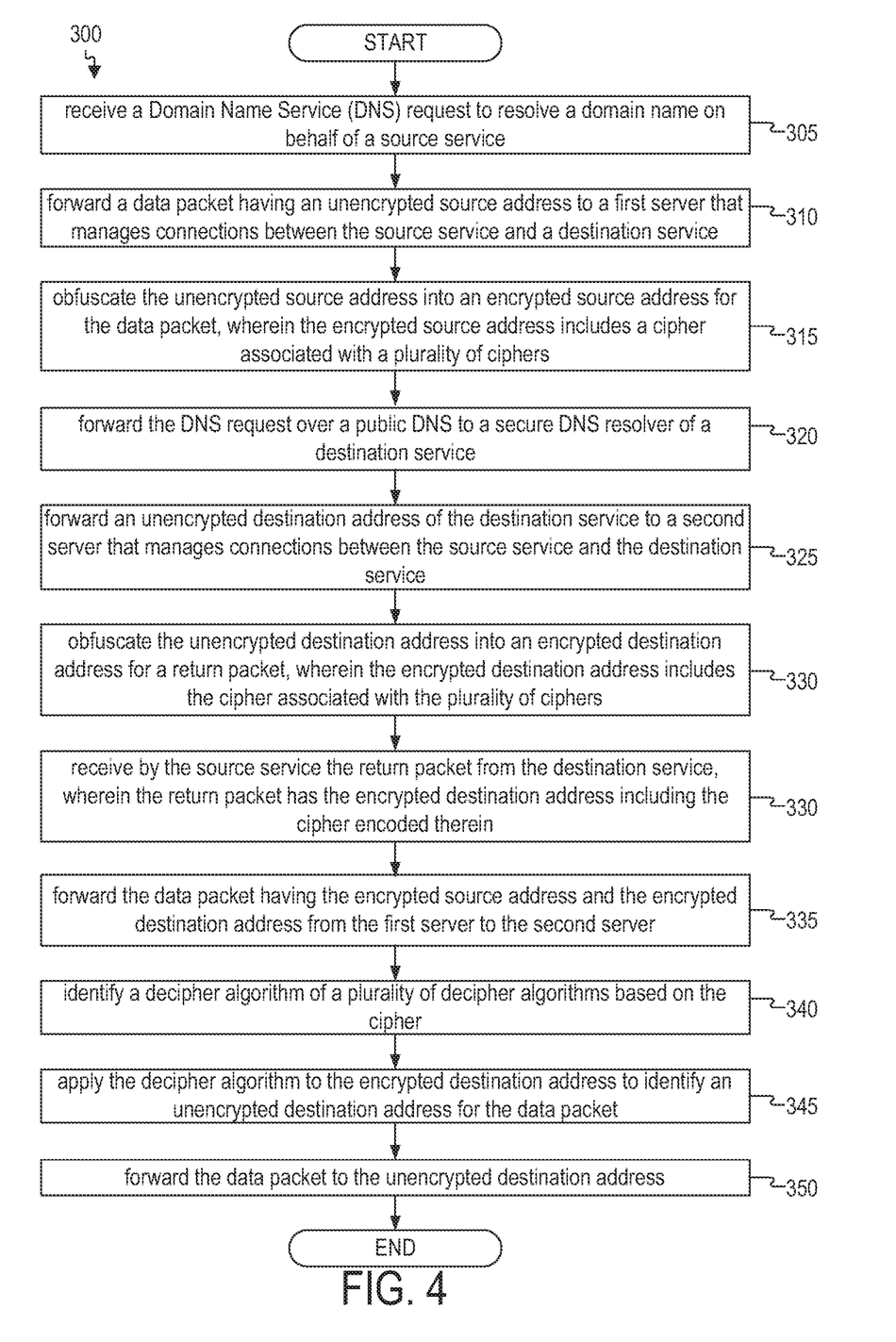
FIG. 4 illustrates a flow chart of a method for providing dynamic NAT66 encryption and decryption in accordance with some embodiments of the present technology.

FIG. 4 illustrates an example method 300 for bidirectionally and concurrently encrypting and decrypting source and destination IP addresses concurrently. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

According to some examples, the method includes receiving a Domain Name Service (DNS) request to resolve a domain name on behalf of a source service at block 305. For example, the public DNS 206 and/or the secure private DNS 226 illustrated in FIG. 3 may receive a Domain Name Service (DNS) request to resolve a domain name on behalf of source 202.

According to some examples, the method includes forwarding a data packet having an unencrypted source address to a first server that manages connections between the source service and a destination service at block 310. For example, the client devices 204 illustrated in FIG. 3 may forward a data packet having an unencrypted source IP address 232 to source NAT component 222 that manages connections between the source 202 and a destination 210.

According to some examples, the method includes obfuscating the unencrypted source address into an encrypted source address for the data packet at block 315. For example, the source NAT component 222 illustrated in FIG. 3 may obfuscate the unencrypted source IP address 232 into an encrypted source IP address 234. In some examples, the encrypted source address includes a cipher associated with a plurality of ciphers. In some of these examples, the cipher may be a 4-bit cipher. In some of these examples, the source address and the destination address comprises a 128-bit IPv6 address comprising a prefix, a cipher bit range, and an address of the source service. In some of these examples, the same cipher is applied to different DNS requests on the same flow. In some other examples, different ciphers of the plurality of ciphers are applied to DNS requests on different flows. Obfuscating the unencrypted source address into an encrypted source address is discussed further in relation to FIG. 5.

According to some examples, the method includes forwarding the DNS request over a public DNS to a secure DNS resolver of a destination service at block 320. For example, the secure private DNS 226 of destination 210 illustrated in FIG. 3 may receive the forwarded DNS request over public DNS 206.

According to some examples, the method includes forwarding an unencrypted destination address to a second server that manages connections between the source service and the destination service at block 325. For example, the secure private DNS 226 illustrated in FIG. 3 may forwarding the unencrypted destination address 236 to destination NAT component 224 that manages connections between the source 202 and the destination 210.

According to some examples, the method includes obfuscating the unencrypted destination address into an encrypted destination address for a return packet at block 330. For example, the destination NAT component 224 illustrated in FIG. 3 may obfuscate the unencrypted destination IP address 236 into an encrypted destination IP address 238. In some examples, the encrypted destination address includes a cipher associated with a plurality of ciphers. In some of these examples, the cipher associated with the encrypted destination address is the same cipher as the cipher associated with the encrypted source address. In some of these examples, the cipher may be a 4-bit cipher. In some of these examples, the source address and the destination address comprises a 128-bit IPv6 address comprising a prefix, a cipher bit range, and an address of the source service. In some examples, the unencrypted source and destination addresses may be a 128-bit IPv6 address and the encrypted source and destination addresses may be a 128-bit IPv6 address. In some examples, the same cipher is applied to different DNS requests on the same flow. In some other examples, different ciphers of the plurality of ciphers are applied to DNS requests on different flows. Obfuscating the unencrypted destination address into an encrypted source address is also discussed further in relation to FIG. 5.

Further, in some examples, the method comprises determining a cipher value for the plurality of ciphers. For example, the source NAT component 222 and/or the destination NAT component 224 illustrated in FIG. 3 may determine a cipher value of the plurality of ciphers. In some examples, the cipher value is randomly determined the from the plurality of ciphers. Further, the method comprises applying a cipher algorithm associated with the cipher value to encode the unencrypted source address and the unencrypted destination address to provide the encrypted source address and the encrypted destination address. In some examples, this is performed concurrently, such that both the source IP address and destination IP address are obfuscated simultaneously. For example, the source NAT component 222 and/or the destination NAT component 224 illustrated in FIG. 3 may apply a cipher algorithm associated with the cipher value to encode the unencrypted source address and the unencrypted destination address to provide the encrypted source address and the encrypted destination address. In some examples, a mapping between the encrypted source/destination address and the unencrypted source/destination address is 1:1.

According to some examples, the method includes forwarding, along a packet flow, the data packet having the encrypted source address and the encrypted destination address from the first server to the second server at block 335. For example, the source 202 and/or the source NAT component 222 illustrated in FIG. 3 may forward, along a packet flow, the data packet having the encrypted source IP address 234 and the encrypted destination IP address 238 to the destination 210 and/or destination NAT component 224.

According to some examples, the method includes identifying a decipher algorithm of a plurality of decipher algorithms based on the cipher at block 340. For example, the destination 210 and/or the destination NAT component 224 illustrated in FIG. 3 may identify a decipher algorithm of a plurality of decipher algorithms based on the cipher encoded in the encrypted source IP address 234 and/or the encrypted destination IP address 238.

According to some examples, the method includes applying the decipher algorithm to the encrypted destination address to identify an unencrypted destination address for the return packet at block 345. For example, the destination 210 and/or the destination NAT component 224 illustrated in FIG. 3 may apply the decipher algorithm to the encrypted destination address to identify an unencrypted destination address for the return packet. The decryption of the encrypted address is discussed further with respect to FIG. 5.

According to some examples, the method includes forwarding the data packet to the unencrypted destination address at block 350. For example, the destination NAT component 224 illustrated in FIG. 3 may forward the return packet to the unencrypted destination address.

Figure 5:
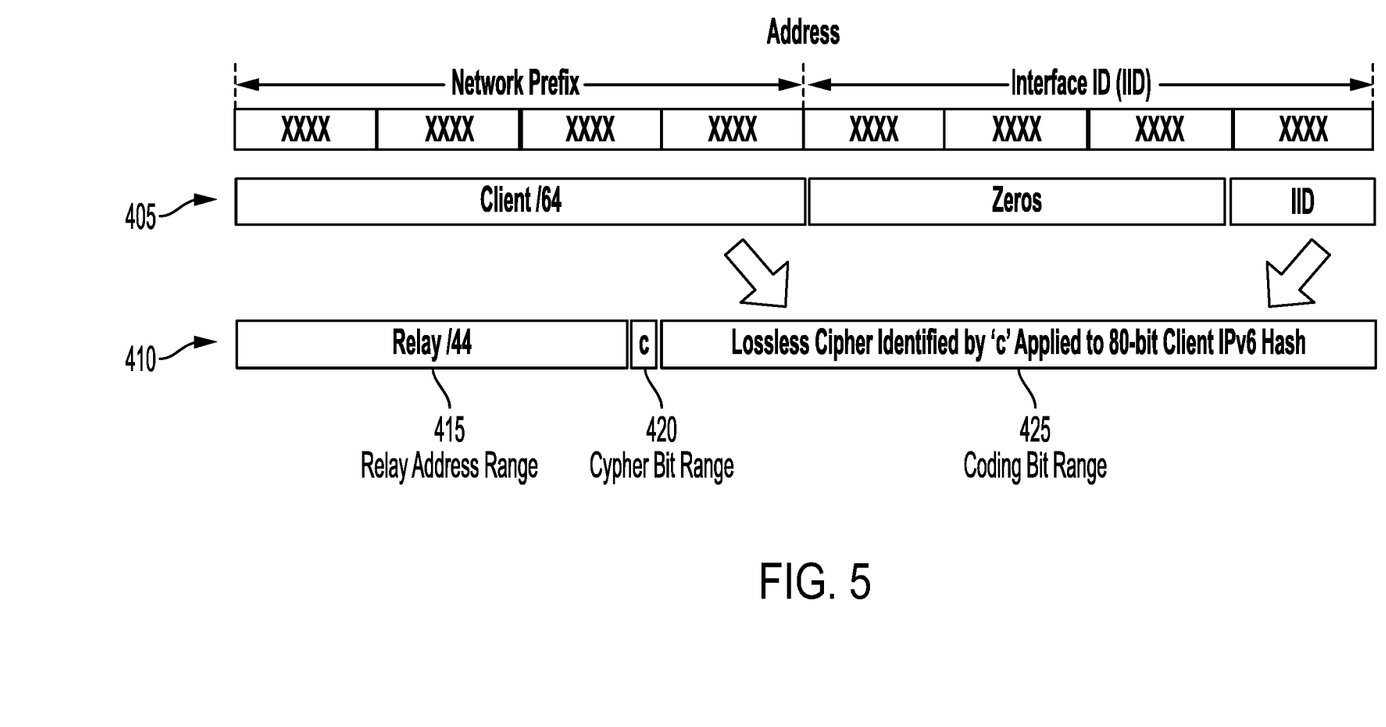
FIG. 5 illustrates address encryption in accordance with some embodiments of the present technology.

FIG. 5 illustrates address obfuscation for the IP address of source 202 or the IP address of destination 210. The process may be the same for both source IP addresses and destination IP addresses. FIG. 5 shows an unencrypted IP address 405 and an encrypted IP address 410. FIG. 5 illustrates the format of a 128-bit IPv6 address that may be used for the IP address of the source 202 and destination 210. Respectively, each "X" shown in the IPV6 address of FIG. 5 may comprise 4 bits. Embodiments of the disclosure may use other address formats and are not limited to a 128-bit IPv6 addresses. As shown in FIG. 5, unencrypted IP address 405 may comprise a network prefix and an Interface Identifier (IID). The network prefix may describe a network location and the interface ID may provide a unique identifying number.

When obfuscating unencrypted IP address 405, a cypher value (e.g., "c") may be assigned to a cipher bit range 420. In some embodiments, cipher bit range 420 may be encoded from bits 45 to 48 of the encrypted source IPv6 address itself to help decrypt the IPV6 address in the reverse direction for packets from server to client. The cipher value (here, "c") may be associated with a first cipher algorithm of a plurality of cipher algorithms. Embodiments of the disclosure may randomly select an active value for the cipher value from a cipher algorithm table associated with the plurality of cipher algorithms. Each respective cipher value is associated with a respective cipher algorithm for purposes of ciphering and deciphering the IP addresses. Thus, this cipher value (e.g., a four bit value) may uniquely identify a current secret cipher algorithm from a rotating set of algorithms that may be known by and coordinated between source 202 (including the first server, such as source NAT component 222) and destination 210 (including the second server, such as destination NAT component 224). In other words, the cipher value may be assigned. This secret 4-bit cipher value may be used to apply the cipher algorithm to transform and obfuscate the address.

To obfuscate unencrypted address 405, the network prefix and interface ID may be encoded by applying the first cipher algorithm to provide coding bit range 425 in encrypted address 410. A relay address may be added to a relay address range 415 such that the location of where the data packet having the encrypted address 410 is to be relayed is known. For example, the relay address range 415 may indicate that the data packet is to be received by source NAT component 222 and/or destination NAT component 224. In this way, a response packet may be routed to source NAT component 222 and/or destination NAT component 224 to be to receive the encryption/encryption process. IP addresses may be encoded in the coding bit range 425 as an 80-bit client IPv6 hash that is associated with the first cipher algorithm and respective cipher.

In some embodiments, the encrypted source IPv6 changes for every new flow from the client because the 4-bit cipher may be configured to change for every new flow initiated by the client. However, as the 5-tuple subscriber flow maintains NAT 4-bit cipher information to encrypt the L3 source IPV6 address for all packets of the same flow, the same 4-bit cipher may be used across the same flows to maintain the IP stable for a flow while accessing a Packet Data Network.

To illustrate this concept, during obfuscation, the unencrypted IP address 405 is encoded into the 80-bit IPv6 hash and associated with the cipher algorithm and unique 4-bit cipher. Thus, the encrypted IP address 410 is formatted as 44-bit NAT Relay prefix+4-bit cipher+80-bit client IPV6 Hash. In the example illustrated in FIG. 5, the 4-bit cipher 'c' helps encrypt the client address, and identifies which cipher and/or decipher algorithm should be applied to the encrypted IP address 410. Thus, once the cipher algorithm is used to obfuscate the source IP address in the uplink direction from source towards the DNS or servers associated with the destination, the servers only sees the encrypted IP address 410, thereby protecting the identity of the IP address.

To un-obfuscate encrypted IP address 410, the cipher value from cipher bit range 420 may be identified. Then a decipher algorithm associated with the cipher value may be used to decode coding bit range 425 in encrypted IP address 410 to provide unencrypted address 405. In other words, the decipher algorithm is used to decrypt the encrypted IP address 410 in the reverse direction and extract the unencrypted IP address 405 from the downlink packet that is sent by the server towards the client that is behind the NAT66 gateway. Thus, the 4-bit cipher carries the key to decrypt the encrypted IP address 410. For example, the cipher 'c' shown in FIG. 5 identifies the decipher/decryption algorithm to be used to decrypt the destination IP address of the data packet. The decipher algorithm is then used get the original source IP address from the encrypted IP address in the packet.

The above encryption/decryption techniques may be used for both source IP address 232 and destination IP address 236. Furthermore, in some embodiments, the cipher value associated with the source IP address 232 and the destination IP address 236 is the same such that the same cipher algorithm and decipher algorithm may be applied. Furthermore, obfuscation pursuant to the above technique may happen with different prefixes as well as based on what comes from the DNS response. Importantly, this dynamic method of encryption/decryption provides source and destination concurrently, such that both source and destination IP addresses are simultaneously protected.

Furthermore, as the cipher is part of the encrypted IP address between bits 45-58, it is persistent in the IP value for the session but never persistent at the NAT66 gateway. Therefore, the system and methods are stateless. Pursuant to this technique, no tables are needed to maintain the encoding cipher. Generally, a cipher may be originated by various methods, including but not limited to: 1) a cipher originated by an entropy derived of the originating device; or 2) a cipher originated by shared information within a LAN (e.g., a number derived from 5-tuples is unique for the session to derive a cipher).

Figure 6:
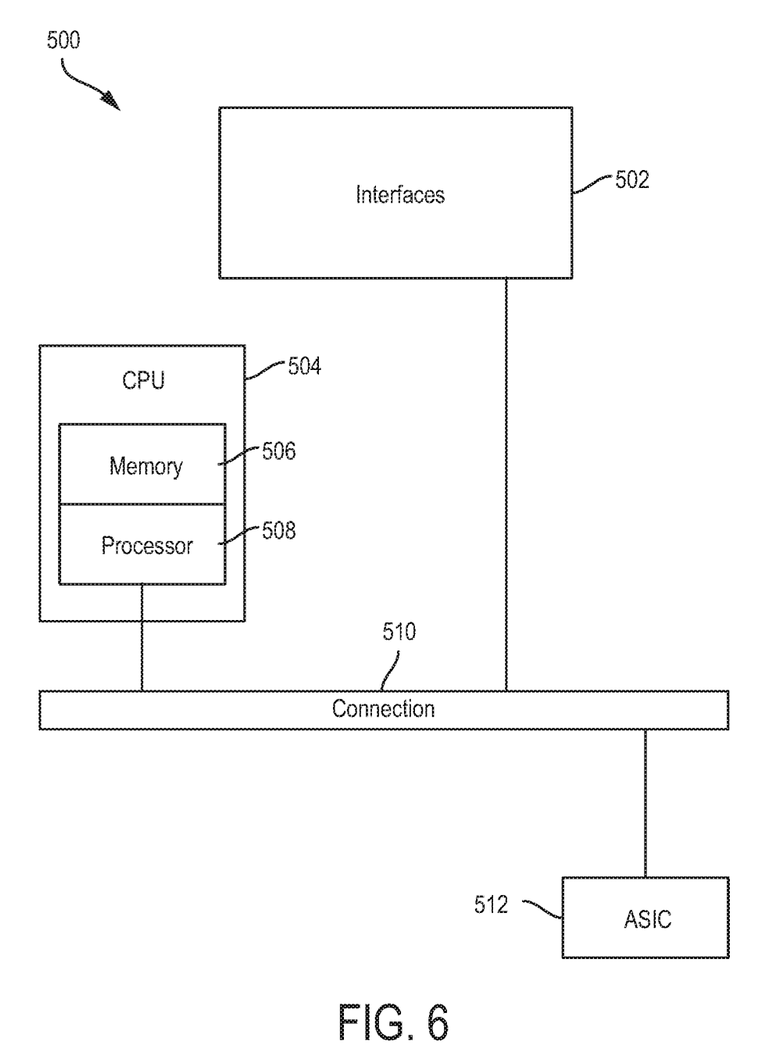
FIG. 6 illustrates an example network device in accordance with some embodiments of the present technology.

FIG. 6 illustrates an example network device 500 suitable for performing switching, routing, load balancing, and other networking operations. The example network device 500 can be implemented as switches, routers, nodes, metadata servers, load balancers, client devices, and so forth.

Network device 500 includes a central processing unit (CPU) 504, interfaces 502, and a bus 510 (e.g., a PCI bus). When acting under the control of appropriate software or firmware, the CPU 504 is responsible for executing packet management, error detection, and/or routing functions. The CPU 504 preferably accomplishes all these functions under the control of software including an operating system and any appropriate applications software. CPU 504 may include one or more processors 508, such as a processor from the INTEL X86 family of microprocessors. In some cases, processor 508 can be specially designed hardware for controlling the operations of network device 500. In some cases, a memory 506 (e.g., non-volatile RAM, ROM, etc.) also forms part of CPU 504. However, there are many different ways in which memory could be coupled to the system.

The interfaces 502 are typically provided as modular interface cards (sometimes referred to as "line cards"). Generally, they control the sending and receiving of data packets over the network and sometimes support other peripherals used with the network device 500. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LORA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communication intensive tasks, these interfaces allow the master CPU (e.g., 504) to efficiently perform routing computations, network diagnostics, security functions, etc.

Although the system shown in FIG. 6 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 500.

Regardless of the network device's configuration, it may employ one or more memories or memory modules (including memory 506) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 506 could also hold various software containers and virtualized execution environments and data.

The network device 500 can also include an application-specific integrated circuit (ASIC), which can be configured to perform routing and/or switching operations. The ASIC can communicate with other components in the network device 500 via the bus 510, to exchange data and signals and coordinate various types of operations by the network device 500, such as routing, switching, and/or data storage operations, for example.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Aspect 1. A method comprising: receiving a Domain Name Service (DNS) request to resolve a domain name on behalf of a source service; forwarding a data packet having an unencrypted source address to a first server that manages connections between the source service and a destination service; obfuscating, by the first server, the unencrypted source address into an encrypted source address for the data packet, wherein the encrypted source address includes a cipher associated with a plurality of ciphers; forwarding the DNS request over a public DNS to a secure DNS resolver of a destination service; forwarding, by the DNS resolver of the destination service, an unencrypted destination address to a second server that manages connections between the source service and the destination service; obfuscating, by the second server, the unencrypted destination address into an encrypted destination address for a return packet, wherein the encrypted destination address includes the cipher associated with the plurality of ciphers; receiving, by the source service, the return packet from the destination service, wherein the return packet has the encrypted destination address including the cipher encoded therein; forwarding, along a packet flow, the data packet having the encrypted source address and the encrypted destination address from the first server to the second server; identifying a decipher algorithm of a plurality of decipher algorithms based on the cipher; applying the decipher algorithm to the encrypted destination address to identify an unencrypted destination address for the data packet; and forwarding the data packet to the unencrypted destination address.

Aspect 2. The method of Aspect 1, wherein the cipher is a 4-bit cipher.

Aspect 3. The method of any of Aspects 1 to 2, wherein the source address and the destination address comprises a 128-bit IPv6 address comprising a prefix, a cipher bit range, and an address of the source service.

Aspect 4. The method of any of Aspects 1 to 3, wherein obfuscating the unencrypted source address into an encrypted source address comprises: determining a cipher value of a plurality of ciphers; and applying a cipher algorithm associated with the cipher value to encode the unencrypted source address to provide the encrypted source address.

Aspect 5. The method of any of Aspects 1 to 4, further comprising randomly determining the cipher value from the plurality of ciphers.

Aspect 6. The method of any of Aspects 1 to 5, wherein the unencrypted source and destination addresses comprises a 128-bit IPv6 address and wherein the encrypted source and destination addresses comprises a 128-bit IPv6 address.

Aspect 7. The method of any of Aspects 1 to 6, wherein the same cipher is applied to different DNS requests on the packet flow.

Aspect 8. The method of any of Aspects 1 to 7, wherein different ciphers of the plurality of ciphers are applied to DNS requests on a packet flow different from the packet flow.

Aspect 9. The method of any of Aspects 1 to 8, wherein a mapping between the encrypted source address and the unencrypted source address is 1:1.

Aspect 10. A system includes a storage (implemented in circuitry) configured to store instructions and a processor. The processor configured to execute the instructions and cause the processor to: receive a Domain Name Service (DNS) request to resolve a domain name on behalf of a source service; forward a data packet having an unencrypted source address to a first server that manages connections between the source service and a destination service; obfuscate, by the first server, the unencrypted source address into an encrypted source address for the data packet, wherein the encrypted source address includes a cipher associated with a plurality of ciphers; forward the DNS request over a public DNS to a secure DNS resolver of a destination service; forward, by the DNS resolver of the destination service, an unencrypted destination address to a second server that manage connections between the source service and the destination service; obfuscate, by the second server, the unencrypted destination address into an encrypted destination address for a return packet, wherein the encrypted destination address includes the cipher associated with the plurality of ciphers; receive, by the source service, the return packet from the destination service, wherein the return packet has the encrypted destination address including the cipher encoded therein; forward, along a packet flow, the data packet having the encrypted source address and the encrypted destination address from the first server to the second server; identify a decipher algorithm of a plurality of decipher algorithms based on the cipher; apply the decipher algorithm to the encrypted destination address to identify an unencrypted destination address for the data packet; and forward the data packet to the unencrypted destination address.

Aspect 11. The system of Aspect 10, wherein the cipher is a 4-bit cipher.

Aspect 12. The system of any of Aspects 10 to 11, wherein the source address and the destination address comprises a 128-bit IPv6 address comprising a prefix, a cipher bit range, and an address of the source service.

Aspect 13. The system of any of Aspects 10 to 12, wherein the processor is configured to execute the instructions and cause the processor to: determine a cipher value of a plurality of ciphers; and apply a cipher algorithm associated with the cipher value to encode the unencrypted source address to provide the encrypted source address.

Aspect 14. The system of any of Aspects 10 to 13, wherein the processor is configured to execute the instructions.

Aspect 15. The system of any of Aspects 10 to 14, wherein the unencrypted source and destination addresses comprises a 128-bit IPv6 address and wherein the encrypted source and destination addresses comprises a 128-bit IPv6 address.

Aspect 16. The system of any of Aspects 10 to 15, wherein the same cipher is applied to different DNS requests on the packet flow.

Aspect 17. The system of any of Aspects 10 to 16, wherein different ciphers of the plurality of ciphers are applied to DNS requests on a packet flow different from the packet flow.

Aspect 18. The system of any of Aspects 10 to 17, wherein a mapping between the encrypted source address and the unencrypted source address is 1:1.

Aspect 19. A computer readable medium comprising instructions using a computer system. The computer includes a memory (e.g., implemented in circuitry) and a processor (or multiple processors) coupled to the memory. The processor (or processors) is configured to execute the computer readable medium and cause the processor to: receive a Domain Name Service (DNS) request to resolve a domain name on behalf of a source service; forward a data packet having an unencrypt-ed source address to a first server that manages connections between the source service and a destination service; obfuscate, by the first server, the unencrypted source address into an encrypted source address for the data packet, wherein the encrypted source address includes a cipher associated with a plurality of ciphers; forward the DNS request over a public DNS to a secure DNS resolver of a destination service; forward, by the DNS resolver of the destination service, an unencrypted destination address to a second server that manage connections between the source service and the destination service; obfuscate, by the second server, the unencrypted destination address into an encrypted destination address for a return packet, wherein the encrypted destination address includes the cipher associated with the plurality of ciphers; receive, by the source service, the return packet from the destination service, wherein the return packet has the encrypted destination address including the cipher encoded therein; forward, along a packet flow, the data packet having the encrypted source address and the encrypted destination address from the first server to the second server; identify a decipher algorithm of a plurality of decipher algorithms based on the cipher; apply the decipher algorithm to the encrypted destination address to identify an unencrypted destination address for the data packet; and forward the data packet to the unencrypted destination address.

Aspect 20. The computer readable medium of Aspect 19, wherein the cipher is a 4-bit cipher.

Aspect 21. The computer readable medium of any of Aspects 19 to 20, wherein the source address and the destination address comprises a 128-bit IPv6 address comprising a prefix, a cipher bit range, and an address of the source service.

Aspect 22. The computer readable medium of any of Aspects 19 to 21, wherein the processor is configured to execute the computer readable medium and cause the processor to: determine a cipher value of a plurality of ciphers; and apply a cipher algorithm associated with the cipher value to encode the unencrypted source address to provide the encrypted source address.

Aspect 23. The computer readable medium of any of Aspects 19 to 22, wherein the processor is configured to execute the computer readable medium.

Aspect 24. The computer readable medium of any of Aspects 19 to 23, wherein the unencrypted source and destination addresses comprises a 128-bit IPv6 address and wherein the encrypted source and destination addresses comprises a 128-bit IPv6 address.

Aspect 25. The computer readable medium of any of Aspects 19 to 24, wherein the same cipher is applied to different DNS requests on the packet flow.

Aspect 26. The computer readable medium of any of Aspects 19 to 25, wherein different ciphers of the plurality of ciphers are applied to DNS requests on a packet flow different from the packet flow.

Aspect 27. The computer readable medium of any of Aspects 19 to 26, wherein a mapping be-tween the encrypted source address and the unencrypted source address is 1:1.

What is claimed is:

1. A method comprising:
   receiving a Domain Name Service (DNS) request to resolve a domain name on behalf of a source service;
   forwarding a data packet having an unencrypted source address to a first server that manages connections between the source service and a destination service;
   obfuscating, by the first server, the unencrypted source address into an encrypted source address for the data packet, wherein the encrypted source address includes a cipher associated with a plurality of ciphers;
   forwarding the DNS request over a public DNS to a secure DNS resolver of a destination service;
   forwarding, by the DNS resolver of the destination service, an unencrypted destination address to a second server that manages connections between the source service and the destination service;
   obfuscating, by the second server, the unencrypted destination address into an encrypted destination address for a return packet, wherein the encrypted destination address includes the cipher associated with the plurality of ciphers;
   receiving, by the source service, the return packet from the destination service, wherein the return packet has the encrypted destination address including the cipher encoded therein;
   forwarding, along a packet flow, the data packet having the encrypted source address and the encrypted destination address from the first server to the second server;
   identifying a decipher algorithm of a plurality of decipher algorithms based on the cipher;
   applying the decipher algorithm to the encrypted destination address to identify an unencrypted destination address for the data packet; and
   forwarding the data packet to the unencrypted destination address.

2. The method of claim 1, wherein the cipher is a 4-bit cipher.

3. The method of claim 1, wherein the source address and the destination address comprises a 128-bit IPv6 address comprising a prefix, a cipher bit range, and an address of the source service.

4. The method of claim 1, wherein obfuscating the unencrypted source address into an encrypted source address comprises:
   determining a cipher value of a plurality of ciphers; and
   applying a cipher algorithm associated with the cipher value to encode the unencrypted source address to provide the encrypted source address.

5. The method of claim 4, further comprising randomly determining the cipher value from the plurality of ciphers.

6. The method of claim 1, wherein the unencrypted source and destination addresses comprises a 128-bit IPv6 address and wherein the encrypted source and destination addresses comprises a 128-bit IPv6 address.

7. The method of claim 1, wherein the same cipher is applied to different DNS requests on the packet flow.

8. The method of claim 1, wherein different ciphers of the plurality of ciphers are applied to DNS requests on a packet flow different from the packet flow.

9. The method of claim 1, wherein the first server and the second server are part of a single server.

10. A system comprising:
a storage configured to store instructions; and
a processor configured to execute the instructions and cause the processor to:
receive a Domain Name Service (DNS) request to resolve a domain name on behalf of a source service;
forward a data packet having an unencrypted source address to a first server that manages connections between the source service and a destination service;
obfuscate, by the first server, the unencrypted source address into an encrypted source address for the data packet, wherein the encrypted source address includes a cipher associated with a plurality of ciphers;
forward the DNS request over a public DNS to a secure DNS resolver of a destination service;
forward, by the DNS resolver of the destination service, an unencrypted destination address to a second server that manage connections between the source service and the destination service;
obfuscate, by the second server, the unencrypted destination address into an encrypted destination address for a return packet, wherein the encrypted destination address includes the cipher associated with the plurality of ciphers;
receive, by the source service, the return packet from the destination service, wherein the return packet has the encrypted destination address including the cipher encoded therein;
forward, along a packet flow, the data packet having the encrypted source address and the encrypted destination address from the first server to the second server;
identify a decipher algorithm of a plurality of decipher algorithms based on the cipher;
apply the decipher algorithm to the encrypted destination address to identify an unencrypted destination address for the data packet; and
forward the data packet to the unencrypted destination address.

11. The system of claim 10, wherein the cipher is a 4-bit cipher.

12. The system of claim 10, wherein the source address and the destination address comprises a 128-bit IPv6 address comprising a prefix, a cipher bit range, and an address of the source service.

13. The system of claim 10, wherein the processor is configured to execute the instructions and cause the processor to:
determine a cipher value of a plurality of ciphers; and
apply a cipher algorithm associated with the cipher value to encode the unencrypted source address to provide the encrypted source address.

14. A non-transitory computer readable medium comprising instructions, the instructions, when executed by a computing system, cause the computing system to:
receive a Domain Name Service (DNS) request to resolve a domain name on behalf of a source service;
forward a data packet having an unencrypted source address to a first server that manages connections between the source service and a destination service;
obfuscate, by the first server, the unencrypted source address into an encrypted source address for the data packet, wherein the encrypted source address includes a cipher associated with a plurality of ciphers;
forward the DNS request over a public DNS to a secure DNS resolver of a destination service;
forward, by the DNS resolver of the destination service, an unencrypted destination address to a second server that manage connections between the source service and the destination service;
obfuscate, by the second server, the unencrypted destination address into an encrypted destination address for a return packet, wherein the encrypted destination address includes the cipher associated with the plurality of ciphers;
receive, by the source service, the return packet from the destination service, wherein the return packet has the encrypted destination address including the cipher encoded therein;
forward, along a packet flow, the data packet having the encrypted source address and the encrypted destination address from the first server to the second server;
identify a decipher algorithm of a plurality of decipher algorithms based on the cipher;
apply the decipher algorithm to the encrypted destination address to identify an unencrypted destination address for the data packet; and
forward the data packet to the unencrypted destination address.

15. The computer readable medium of claim 14, the cipher is a 4-bit cipher.

16. The computer readable medium of claim 14, the source address and the destination address comprises a 128-bit IPv6 address comprising a prefix, a cipher bit range, and an address of the source service.

17. The computer readable medium of claim 14, wherein the computer readable medium further comprises instructions that, when executed by the computing system, cause the computing system to:
determine a cipher value of a plurality of ciphers; and
apply a cipher algorithm associated with the cipher value to encode the unencrypted source address to provide the encrypted source address.

18. The computer readable medium of claim 14, the unencrypted source and destination addresses comprises a 128-bit IPv6 address and wherein the encrypted source and destination addresses comprises a 128-bit IPv6 address.

19. The computer readable medium of claim 14, the same cipher is applied to different DNS requests on the packet flow.

20. The computer readable medium of claim 14, different ciphers of the plurality of ciphers are applied to DNS requests on a packet flow different from the packet flow.

* * * * *